(12) United States Patent
Frommann et al.

(10) Patent No.: US 10,112,511 B2
(45) Date of Patent: Oct. 30, 2018

(54) METHOD AND SYSTEM FOR CONTROLLING AN ACTUATOR FOR A LOADING SURFACE THAT IS ADJUSTABLY MOUNTED ON A MOTOR VEHICLE BODY

(71) Applicant: GM GLOBAL TECHNOLOGY OPERATIONS LLC, Detroit, MI (US)

(72) Inventors: Markus Frommann, Bingen am Rhein (DE); Oleg Mazur, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/051,049

(22) Filed: Feb. 23, 2016

(65) Prior Publication Data
US 2016/0243963 A1    Aug. 25, 2016

(30) Foreign Application Priority Data

Feb. 23, 2015    (DE) .................. 10 2015 002 116

(51) Int. Cl.
*B60N 2/427* (2006.01)
*B60R 21/0136* (2006.01)
(Continued)

(52) U.S. Cl.
CPC ......... *B60N 2/4279* (2013.01); *B60N 2/4214* (2013.01); *B60N 2/4235* (2013.01); *B60N 2/42736* (2013.01); *B60R 21/0134* (2013.01); *B60R 21/0136* (2013.01); *B60R 21/01516* (2014.10); *B60R 2021/01252* (2013.01)

(58) Field of Classification Search
CPC .................................................. B60N 2/4279
See application file for complete search history.

(56) References Cited

U.S. PATENT DOCUMENTS 8,434,819 B2    5/2013  Guerrero
8,442,726 B2    5/2013  Zimmermann et al.
(Continued)

FOREIGN PATENT DOCUMENTS

DE            4415467 C1    11/1995
DE      102006051240 A1     5/2008
(Continued)

OTHER PUBLICATIONS

German Patent Office, German Search Report for German Application No. 102015002116.8, dated May 19, 2015.

*Primary Examiner* — Jonathan M Dager
*Assistant Examiner* — Garrett F Evans
(74) *Attorney, Agent, or Firm* — Lorenz & Kopf, LLP

(57) ABSTRACT

A method and a system are configured to control an actuator for imposing forces in an adjusting direction, in particular a vehicle longitudinal direction from a vehicle front towards a vehicle rear, onto a loading surface, such as a vehicle seat, which is adjustably mounted on a body of a motor vehicle. A collision-based event is anticipate or detected. An actuator is activated in response to detection of the collision-based event in order to activate an actuator-driven movement of the loading surface relative to the body in adjusting direction for influencing, and in particular decelerate a collision-based movement of the loading surface relative to the body against the adjusting direction.

20 Claims, 2 Drawing Sheets

(51) Int. Cl.
    *B60R 21/0134*    (2006.01)
    *B60R 21/015*     (2006.01)
    *B60N 2/42*       (2006.01)
    *B60R 21/01*      (2006.01)

(56)            References Cited

U.S. PATENT DOCUMENTS

2002/0177934 A1*  11/2002  Yokota ................. B60N 2/2821
                                                        701/45
2007/0185635 A1    8/2007  Mattes et al.
2008/0162002 A1    7/2008  Bacher et al.
2011/0291448 A1   12/2011  Hashimoto
2012/0173085 A1*   7/2012  Hilberer ............. B60G 17/0195
                                                        701/46

FOREIGN PATENT DOCUMENTS

DE      102011122384 A1    9/2012
DE      102011102093 A1   11/2012
DE      102011108918 A1    1/2013
DE      102011122203 A1    6/2013
DE      102012004007 A1    8/2013
DE      102014005572 A1   11/2014
DE      102013009717 A1   12/2014

* cited by examiner

METHOD AND SYSTEM FOR CONTROLLING AN ACTUATOR FOR A LOADING SURFACE THAT IS ADJUSTABLY MOUNTED ON A MOTOR VEHICLE BODY

CROSS-REFERENCE TO RELATED APPLICATION

This application claims priority to German Patent Application No. 102015002116.8, filed Feb. 23, 2015, which is incorporated herein by reference in its entirety.

TECHNICAL FIELD

The present disclosure pertains to a method and to a system for controlling an actuator configured to impose forces onto a loading surface, which is adjustably mounted on a body of a motor vehicle, and to a motor vehicle having the system and a computer program product for carrying out the method.

BACKGROUND

DE 44 15 467 C1 discloses a safety device for vehicles having a vehicle seat, which is moveably arranged relative to the superstructure and which in the case of an impact is forcibly moved pyrotechnically against an impact direction. A retractor, damping element and a steel cable elasticity are matched to one another so that a subsequent movement in impact direction is decelerated as gently as possible.

SUMMARY

The present disclosure provides a system for controlling an actuator for a loading surface that is adjustably mounted on a motor vehicle body to protect a payload, in particular a vehicle occupant, during a collision of a motor vehicle. According to an aspect of the present disclosure, a motor vehicle, in particular a passenger car, includes a body, a loading surface, in particular a vehicle seat or for the transport of goods, which is adjustably mounted in an adjusting direction on the body in particular in a rail-guided manner, an actuator which may be electro motoric, electromagnetic, pneumatic, hydraulic and/or electric, in particular electronically, pneumatically and/or hydraulically controlled for imposing forces in the adjusting direction on the loading surface. The adjusting direction in an embodiment is a vehicle longitudinal direction from a vehicle front towards a vehicle rear and/or a vehicle transverse direction from a vehicle side towards a vehicle side located opposite.

According to an aspect of the present disclosure, a method for controlling the actuator for imposing forces in the adjusting direction onto the loading surface is also provided. The actuator is activated in order to influence, in particular decelerate a collision-related movement of the loading surface relative to the body. A system is equipped according to an aspect of the present disclosure for carrying out a method described here and/or includes a controller for activating the actuator in order to influence, in particular decelerate a collision-related movement of the loading surface relative to the body against the adjusting direction, in particular beyond a stationary state of the motor vehicle during a subsequent acceleration of the body in adjusting direction.

As a consequence of a collision, the body can generally be positively accelerated severely, absolutely or relative to the vehicle surroundings in the adjusting direction, in particular its absolute speed can be generally decelerated vehemently. As a consequence, the loading surface can move against the adjusting direction relative to the body due to the collision. In an embodiment, the actuator is activated in a phase in which the body due to the collision positively accelerates in adjusting direction, in particular a forward movement of the body against the vehicle longitudinal direction is decelerated, in order to influence a collision-related movement of the loading surface against the adjusting direction relative to the body on which it is mounted, in particular to decelerate a collision-related movement of the loading surface towards the vehicle front and/or vehicle side in a controlled, in particular regulated manner.

A controller activates the actuator in a phase in which the body due to the collision is positively accelerated in adjusting direction and/or the loading surface due to the collision moves relative to the body against the adjusting direction, in particular in a force-controlled, or force-regulated manner such that it decelerates the collision-related movement of the loading surface relative to the body on the basis of a preset position, speed, acceleration or force profile. The basis may be a preset permissible or set point position, set point speed, set point acceleration or set point force, or exerts corresponding forces onto the loading surface or is equipped for this purpose. In particular, the actuator is activated to transmit to vary actuating or set point values, which can be determined in particular in such a manner that an acceleration or loading of the loading surface does not exceed a preset permissible acceleration or loading.

In that an actuator in the phase in which the body is positively accelerated in adjusting direction due to the collision, in particular activated corresponding to a preset profile, a collision-related movement of the loading surface in an embodiment and/or a loading of the loading surface and/or of its payload as a consequence of or after the collision occurring in the process can be optimized, in particular adapted to peripheral conditions, in particular the accident situation, a preset loading limit and/or the payload.

In an embodiment, the actuator is activated beforehand in order to accelerate, in particular forcibly move the loading surface before an imminent collision in adjusting direction relative to the body in adjusting direction in a controlled manner in the case that an imminent collision is detected. Accordingly, in an embodiment, the means for actuating the actuator actuates the same in order to following an actuator-driven movement of the loading surface relative to the body in adjusting direction then influence a collision-related movement of the loading surface relative to the body in the manner described herein.

Accordingly, a method in an embodiment, an imminent collision of the motor vehicle is detected, and the actuator is activated in order to accelerate, in particular forcibly move the loading surface relative to the body in adjusting direction in a controlled manner before the imminent collision in the case that an imminent collision is detected.

Accordingly, a system in an embodiment includes means for detecting an imminent collision of the motor vehicle, and a controller configured to activate the actuator to accelerate the loading surface in adjusting direction in particular forcibly move the same in adjusting direction in a controlled manner in the case an imminent collision is detected. The means for detecting an imminent collision detects, in an embodiment, an imminent collision optically, by means of radar and/or ultrasound, on the basis of a brake actuation, by means of communication between motor vehicles or the like or is equipped for this purpose. In an embodiment, it includes at least one sensor for this purpose.

By way of this in particular positive acceleration or relative forcible movement relative to the body in adjusting direction before the imminent collision, an inertial or absolute speed and thus a kinetic energy of the loading surface and its payload, in particular of an occupant of a vehicle seat, to be dissipated can be advantageously reduced in an embodiment. Additionally or alternatively, a deceleration distance, in an embodiment, for decreasing the absolute speed and/or the kinetic energy during or as a consequence of the collision can be extended. In addition or alternatively, the payload, in an embodiment, can already be "pre-accelerated" in adjusting direction, in particular vehicle transverse direction, so that a subsequent acceleration due to the collision is reduced.

Such a forcible acceleration in adjusting direction can be omitted or not provided in another embodiment. Accordingly, in an embodiment, the controller activates the actuator in order to influence, in particular decelerate a collision-related movement of the loading surface relative to the body against the adjusting direction, wherein the collision-related movement against the adjusting direction takes place or is initialed from a stationary state or a loading surface that is at rest relative to the body or without preceding actuator-driven movement of the loading surface in adjusting direction, or is equipped for this purpose.

In an embodiment, the method detects a state of collision of the motor vehicle, and release a fixing of the loading surface in the case that a state of collision is detected. The system in an embodiment includes controller configured to detect a state of collision of the motor vehicle and to release a fixing of the loading surface, in the case that a state of collision is detected.

A detected state of collision can in particular be the detected imminent collision of the motor vehicle described above. Accordingly, the means for detecting a state of collision of the motor vehicle can be a means for detecting an imminent collision of the motor vehicle, in particular the one described above. Equally, a detected state of collision can in particular be a detected collision of the motor vehicle that has taken place. Accordingly, the means for detecting a state of collision of the motor vehicle can be a means for detecting a collision of the motor vehicle that has taken place. A collision that has taken place can be detected in particular on the basis of a detected acceleration and/or corresponding acceleration or inertia forces. Accordingly, the means for detecting a collision of the motor vehicle that has taken place can include in particular acceleration and/or force measurement sensors.

Prior to activation of the actuator for influencing of a collision-related movement of the loading surface against the adjusting direction the loading surface is initially accelerated in adjusting direction in an actuator-driven manner before the imminent collision, the controller is configured to release a fixing of the loading surface before this acceleration in adjusting direction or is equipped for this purpose. In another embodiment, prior to activation of the actuator for influencing of a collision-related movement of the loading surface against the adjusting direction from a stationary state or a loading surface at rest or without preceding actuator-driven movement of the loading surface in adjusting direction takes place or is initiated, the controller is configured to release a fixing of the loading surface, in an embodiment, releases this fixing in particular immediately prior to activation of the actuator to influence a collision-related movement of the loading surface against the adjusting direction or is equipped for this purpose.

By way of a preceding fixing, an energy consumption of the actuator during normal operation, can be reduced in an embodiment in particular to zero. The fixing, in an embodiment, is mechanical, in particular positive. Additionally or alternatively, the fixing can also be electromagnetic and/or pneumatic and/or hydraulic. It can be integrally formed with or separately from the actuator. Accordingly, a mechanical fixing, in an embodiment can for example include one or multiple protrusions which positively engage behind undercuts of the loading surface or their mounting and in the case of a detected state of collision are pulled back, folded away or disassembled, in particular burst. A hydraulic fixing can for example include one or more actuating valves, which in the closed state prevent an outflow of a fluid as a consequence of a movement of the loading surface against the adjusting direction and thus also a movement of the loading surface, and are opened in the case of a detected state of collision in order to thereby make possible a controlled, regulated outflow of the fluid as a consequence of a collision-related movement of the loading surface against the adjusting direction, against which the hydraulic actuator offers a resistance and thus imposes (resistance) forces in the adjusting direction on the loading surface.

The controller may be configured to release a fixing in an embodiment mechanically, electromagnetically, pneumatically, hydraulically and/or pyrotechnically, in particular through electric activation of a mechanical, electromagnetic, pneumatic, hydraulic and/or pyrotechnical one or multiple-part control element of the fixing, or is equipped for this purpose. It will be appreciated that an example includes a hydraulic actuator with one or more actuating valves for influencing an outflow of a fluid as a consequence of a collision-related movement of the loading surface against the adjusting direction. These actuating valves in the closed state can form a fixing that is formed integrally with the hydraulic actuator. The controllable actuator in an embodiment imposes passive resistance forces on the loading surface, which in a collision-related movement of the loading surface counteract against the adjusting direction of a collision-related movement of the loading surface and thus in adjusting direction. Without a collision-related movement of the loading surface against the adjusting direction, such passive resistance forces imposed by the actuator are obsolete. Equally, an actuator can also impose active actuating forces in adjusting direction, which can act on the loading surface in adjusting direction even without a collision-related movement of the loading surface against the adjusting direction, again purely exemplarily on the example of a pneumatic actuator by way of pressure or fluid supply or on the example of an electro motoric or electromagnetic actuator by way of energizing. Thus, the actuator, in an embodiment, is generally equipped for imposing passive resistance forces which are obsolete without collision-related movement of the loading surface against the adjusting direction, and/or for imposing active actuating forces, which act even without a collision-related movement or adjustment of the loading surface against the adjusting direction.

In an embodiment, the controller is configured to activate the actuator beyond a collision-related stationary state of the motor vehicle, in particular during a subsequent, in particular positive acceleration of the motor vehicle or of the body in adjusting direction in order to influence an in particular collision-related movement of the loading surface relative to the body, in particular against the adjusting direction, or is equipped for this purpose. Because of this, the deceleration distance of the loading surface and the loads that occur in the process can, in an embodiment, be further optimized even after a collision-related stationary state of the motor vehicle. In particular, a so-called rebound or elastic springing-back of the motor vehicle or of its body in adjusting direction can also be offset in an embodiment, at least partially.

In an embodiment, a permissible feed travel of the loading surface against the adjusting direction is determined in particular before and/or during the collision-related movement of the loading surface relative to the body against the adjusting direction and the actuator activated based on this determined permissible feed travel in particular in such a manner that it does not exceed the same.

Accordingly, the system in an embodiment to determine a permissible feed travel of the loading surface against the adjusting direction, in particular before and/or during a collision-related movement of the loading surface relative to the body against the adjusting direction. The controller is configured to activate the actuator in order to activate the actuator based on the determined permissible feed travel in such a manner that it does not exceed the same. The permissible feed travel may be determined in an embodiment based on an interior monitoring device that is arranged on a vehicle seat fixed to the body, in particular to an instrument panel, a vehicle seat that is nearer the vehicle front or vehicle side wall and/or arranged fixed on the loading surface, in particular at the front and/or side on the loading surface, in particular optically, by means of radar and/or ultrasound and/or load detection, in particular by means of a force measurement sensor, or is equipped for this purpose.

Because of this, a feed travel that is maximally available can be determined, in an embodiment, in advance and/or the collision-related movement of the loading surface relative to the body against the adjusting direction determined in advance and utilized as far as possible. For example, a force and/or distance sensor on an instrument panel, vehicle side wall or a vehicle seat nearer a vehicle front detects a distance from or a loading of the instrument panel, vehicle side wall or of the vehicle seat that is nearer the vehicle front as a consequence of the collision-related movement of the loading surface and suitably vary, in particular limit, in particular terminate the collision-related movement through suitable activation of the actuator. In particular, the controller activates the actuator in order to decelerate a collision-related movement of the loading surface relative to the body against the adjusting direction within the permissible feed travel to a stationary state relative to the body.

In an embodiment, the system is configured to determine a starting position of the loading surface before an actuator-driven acceleration in adjusting direction before the imminent collision, which determines a starting position of the loading surface relative to the body or is equipped for this purpose. The controller is configured to activate the actuator based on the determined starting position or is equipped for this purpose, in particular in such a manner that the loading surface as a consequence of the collision overruns the determined starting position maximally by a preset distance, in particular does not overrun the determined starting position. Because of this, the risk that the loading surface and/or its payload, in particular a vehicle occupant, is impaired, in an embodiment, as a consequence of the positively controlled movement of the loading surface relative to the body as a consequence of the collision through components such as for example a steering wheel, an instrument panel, a backrest of a further vehicle seat or the like arranged in front of it. Such consideration of the starting position of the loading surface before an actuator-driven acceleration in adjusting direction thus constitutes an advantageous possibility of an activation of an actuator based on a feed travel determined before the collision-related movement of the loading surface.

A collision-related movement of the loading surface depends on a weight of the loading surface and a payload arranged on the same and co-moved with the same, in particular a weight of an occupant of a vehicle seat. For this reason, the system may be configured to determine a weight of a payload of the loading surface, in particular of a weight of an occupant of the vehicle seat, which determines the payload weight or is equipped for this purpose, wherein the means for actuating the actuator activates the actuator based on the determined payload weight or is equipped for this purpose. Accordingly, in an embodiment, the actuator can be activated in particular for imposing a greater force when a greater payload weight has been determined, in particular a determined payload weight exceeds a preset upper limit value, and for imposing a force that is lower with respect to the same, when a payload weight that is lower with respect to the same has been determined, in particular a determined payload weight undershoots the preset upper limit value.

In an embodiment, the controller is configured to activate the actuator based on a preset permissible, in particular maximal acceleration or is equipped for this purpose. Because of this, a loading of the loading surface and its payload, in particular of a vehicle occupant, can be optimized, in an embodiment, during the collision-related movement against the adjusting direction and/or during a subsequent movement of the body in adjusting direction after the collision, in particular also during a rebound, as far as possible.

In an embodiment, the system is configured to determine a current acceleration of the body and/or of the loading surface. The controller is configured to activate the actuator based on the determined current acceleration in order to influence a collision-related movement of the loading surface against the adjusting direction relative to the body on which it is mounted, in particular decelerate or slow down a collision-related movement of the loading surface towards the vehicle front and/or vehicle side in a controlled manner, or is equipped for this purpose. In particular, a force in adjusting direction, which the actuator imposes on the loading surface, can be preset or the actuator suitably activated based on a determined current acceleration in particular proportionally to a determined current acceleration or a difference between a preset permissible and a determined current acceleration.

In an embodiment, the actuator, during the collision-related movement of the loading surface against the adjusting direction, is also activated in a further development beyond a stationary state of the motor vehicle in order to achieve a preset damping or damping characteristic of this movement.

In an embodiment, the loading surface includes a one or multi-part safety means that is fixed to the loading surface or arranged on the loading surface and can be moved with the loading surface relative to the body, in particular a safety belt, for the releasable securing, in particular fastening of a payload, in particular of an occupant of the vehicle seat, on the loading surface. Because of this, the payload, in particular an occupant, can be advantageously moved by the actuator together with the loading surface in an embodiment or a movement of the payload be influenced by the actuator, in particular decelerated.

The controller, in terms of the present disclosure, can be designed as hardware and/or software, in particular include a digital processing, in particular microprocessor unit (CPU)

that is data or signal-connected to a storage and/or bus system and/or one or more programs or program modules. The CPU can be designed in order to execute command, which are implemented as a program stored in a storage system, detect input signals from a data bus and/or emit output signals to a data bus. A storage system can include one or more, in particular different storage media, in particular optical, magnetic, solid-state and/or other non-volatile media. The program can be such in nature that it embodies the method described here or is capable of carrying out the same, so that the CPU can execute the steps of such method and can thereby in particular control, in particular regulate the actuator.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
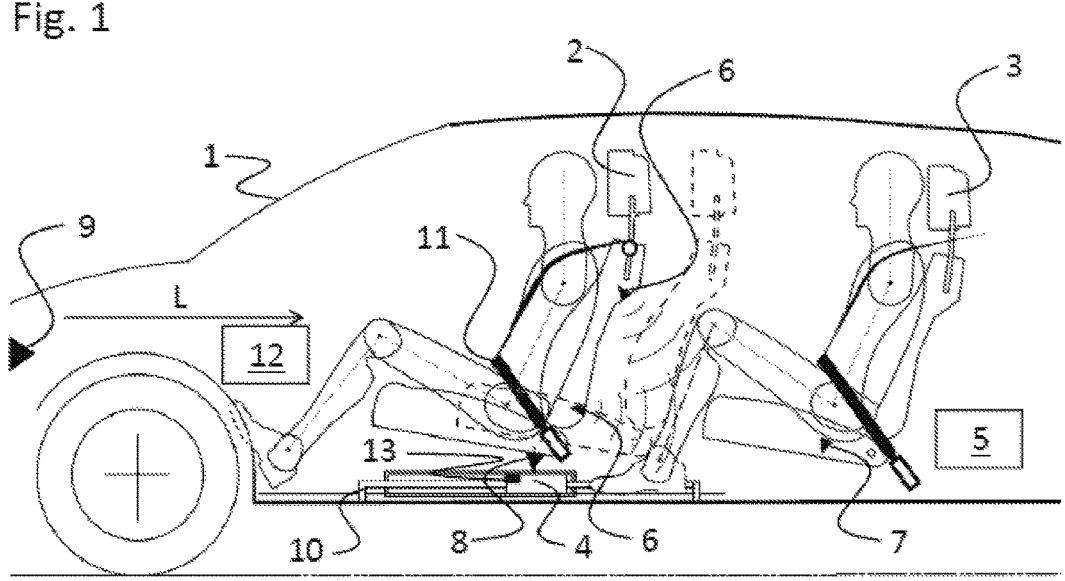
FIG. 1 a motor vehicle with a system according to an embodiment of the present disclosure and FIG. 2 the sequence of a method according to an embodiment of the present disclosure.

FIG. 1 shows a motor vehicle according to an embodiment of the present disclosure with a body 1, a front vehicle seat 2, which is adjustably mounted on the body 1 guided in rails in an adjusting device in the form of a vehicle longitudinal direction L from a vehicle front towards a vehicle rear (to the right in FIG. 1), a further rear vehicle seat 3, a controlled actuator 4 for imposing forces in the vehicle longitudinal or adjusting direction L on the front vehicle seat 2, and with a system having a means for activating the actuator 4 in the form of an electronic control unit (ECU) or simply a controller 5, which is signal-connected to the actuator 4 and in terms of program equipped to carry out a method described here. The front vehicle seat 2 which is adjustable in a rail-guided manner includes a securing means that is fixed on the vehicle seat, arranged on the vehicle seat 2 and moveable with the same relative to the body 1 in the form of a safety belt 11 for the releasable securing of an occupant.

The system includes a sensor configured to determine a permissible resetting travel of the front vehicle seat 2 in vehicle longitudinal or adjusting direction, which includes an interior monitoring device 6 arranged on its back and/or a seat occupancy detection 7 of the rear, further vehicle seat 3, which is signal-connected to the ECU 5.

The system includes a force measurement device 8 configured to determine an occupant weight of the front vehicle seat 2. The force measurement device 8 on the front vehicle seat 2 is signal-connected to the ECU 5. The system includes a radar detection device for the radar-based detecting of an imminent collision and for detecting an acceleration of the body 1, which is signal-connected to the ECU 5. The system measurement sensor 10 for determining a starting position of the front vehicle seat 2 before an acceleration of the vehicle seat 2 in vehicle longitudinal or adjusting direction L before an imminent collision, which is signal-connected to the ECU 5. In addition, the system includes a force or distance sensor 12 for determining a loading of an instrument panel (not shown) as a consequence of a contact with the vehicle occupant or a distance between instrument panel and vehicle occupant, which is signal-connected to the ECU 5.

Figure 2:
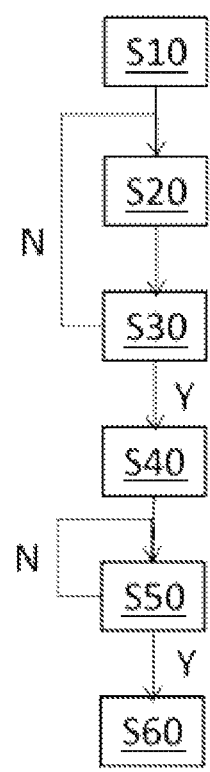

With reference to FIG. 2, a method according to an embodiment of the present disclosure is explained in the following, which the system, in particular its ECU 5, which in terms of program is equipped for this purpose, carries out.

At block S10, an occupant weight of the front vehicle seat 2 is determined in particular before or when driving off. At block S20, a starting position and a permissible resetting travel of the front vehicle seat 2 are determined, in particular continuously or periodically. A radiation of the interior monitoring device 6 and dashed lines the vehicle seat 2 that is adjustable in vehicle longitudinal or adjusting direction L by the determined maximum permissible resetting travel is exemplarily shown for this purpose in FIG. 1.

At block S30, an imminent collision of the vehicle is detected. For as long as no imminent collision is detected (S30: "N"), the method returns to block 20. If in block S30 an imminent collision of the motor vehicle is detected (S30: "Y"), a fixing 13 of the front vehicle seat 2 is released in a block S40 and the actuator 4 actuated in order to accelerate the front vehicle seat 2 in vehicle longitudinal or adjusting direction L to the right in FIG. 1.

Here, the ECU 5 activates the actuator 4 based on the detected occupant weight, the determined permissible resetting travel and the determined time pending the collision in such a manner that at the time of the collision calculated in advance the absolute speed of the vehicle seat 2 is minimized as far as possible and/or the travelled resetting travel is maximized as far as possible without exceeding the permissible resetting travel, as is indicated in dashed lines in FIG. 1.

The fixing 13 can for example include mechanical protrusions, which engage behind undercuts of the mounting of the front vehicle seat 2 and upon activation by the ECU 5 are retracted, pivoted in or dismantled or destroyed. Equally, the fixing 13 can for example include control valves, which upon activation by the ECU 5, are opened, in particular dismantled or destroyed.

As soon as, a collision that has taken place is detected (S50: "Y") based on the detected current acceleration, the ECU 5, at block S60, activates the actuator 4 based on the detected current and a preset maximum acceleration, of the detected occupant weight and of the detected starting position in order to decelerate a collision-related movement of the vehicle seat 2 against the vehicle longitudinal or travelling direction L relative to the body 1 on which it is mounted in a controlled manner. Here, the ECU 5 activates the actuator 4 beyond a collision-related stationary state of the motor vehicle, in particular even still during a subsequent positive acceleration of the body 1 in vehicle longitudinal or adjusting direction L in order to at least partially offset a rebound.

The ECU 5 activates the actuator 4 in block S60 in such a manner that the vehicle seat 2 as a consequence of the collision does not overrun the determined starting position. Here, it activates the actuator 4 based on the detected occupant weight in such a manner that the collision-related forward movement of the vehicle seat 2 follows a preset profile, in particular a preset permissible acceleration is not exceeded. In a modification, the ECU 5 can also activate the actuator 4 in block S60 in such a manner that the vehicle seat 2 as a consequence of the collision overruns the determined starting position, in particular maximally by a preset travel.

Additionally, the ECU 5 activates the actuator 4 in block S60 in such a manner that a loading detected by the sensor 12 does not exceed a preset permissible loading or a distance detected by the sensor 12 does not undershoot a preset permissible minimum distance. In the case that the loading detected by the sensor 12 exceeds the preset permissible loading or the distance detected by the sensor 12 undershoots the preset permissible minimum distance, the ECU 5 activates the actuator 4 in block S60 in such a manner that the same increases the force in adjusting direction in the front vehicle seat 2 to a maximum value. Because of this, a permissible feed travel against the adjusting direction L is determined in addition to the consideration of the starting position, which determines a permissible feed travel determined before the collision-related movement of the front vehicle seat 2 against the adjusting direction L even during the collision-related movement of the front vehicle seat 2 against the adjusting direction L and activates the actuator 4 based on this determined feed travel.

Although in the preceding description exemplary embodiments were explained it is pointed out that a multitude of modifications is possible.

Accordingly, the initial acceleration of the vehicle seat 2 in adjusting direction L before an imminent collision described with reference to block S40 can also be omitted and instead when a collision that is imminent or has taken place is detected, the fixing 13 be released and the actuator 4 controlled in the manner described with reference to block S60 in order to bring about a desired damping characteristic of the collision-related movement of the vehicle seat 2 with occupants secured therein by the safety belt 11.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling an actuator via a controller in communication with a sensor and the actuator for imposing forces onto a loading surface in an adjusting direction from a first vehicle position to a second vehicle position, wherein the loading surface is adjustably-mounted in a vehicle body of a motor vehicle for movement in the adjusting direction, the method comprising:
    detecting a collision-based event associated with the vehicle body; and
    activating the actuator to generate an actuator-driven movement of the loading surface relative to the body in the adjusting direction to decelerate a collision-based movement of the loading surface relative to the body opposing the actuator-drive movement, wherein; the actuator-driven movement follows a preset profile to at least partially offset a movement of the loading surface arising from a rebound effect of the motor vehicle post the collision-based event.

2. The method according to claim 1, further comprising: detecting a state of collision of the motor vehicle; and releasing a fixing mechanism of the loading surface when a state of collision is detected.

3. The method according to claim 1 further comprising: detecting an imminent collision of the motor vehicle; and activating the actuator in order to accelerate the loading surface in adjusting direction when an imminent collision is detected.

4. The method according to claim 3 further comprising activating the actuator beyond a stationary state of the motor vehicle in the adjusting direction to decelerate a movement of the loading surface relative to the body.

5. The method according to claim 1 wherein the actuator is activated before the imminent collision.

6. The method according to claim 1, further comprising determining a permissible feed travel of the loading surface against the adjusting direction, and activating the actuator based on the determined permissible feed travel.

7. The method according to claim 6, further comprising determining the permissible feed travel of the loading surface before the collision-based movement of the loading surface relative to the body against the adjusting direction.

8. The method according to claim 6, further comprising determining the permissible feed travel of the loading surface during the collision-based movement of the loading surface relative to the body against the adjusting direction.

9. The method according to claim 1, further comprising determining a starting position of the loading surface, and activating the actuator is activated based on the determined starting position.

10. The method according to claim 1, further comprising determining a weight of a payload of the loading surface, and activating the actuator based on the determined payload weight.

11. The method according to claim 10, wherein loading surface comprises a vehicle seat and the payload comprising an occupant weight.

12. The method according to claim 1, further comprising activating the actuator based on a predetermined acceleration.

13. A motor vehicle with a body, a loading surface in the form of a vehicle seat, which is adjustably mounted on the body in an adjusting direction, and an actuator configured to impose a force onto the loading surface in the adjusting direction according to the method of claim 1.

14. A computer program product with a program code which is stored on a non-transitory computer-readable medium, which when executed in a controller is configured to carry out the method according to claim 1.

15. A system for imposing forces in an adjusting direction onto a vehicle seat adjustably mounted on a body of a motor vehicle, the system comprising:
    a sensor configured to detect a collision-based event associated with the vehicle body;
    an actuator configured to generate an actuator-driven movement of the vehicle seat relative to the body in an adjusting direction; and
    a controller in communication with the sensor and the actuator, the controller configured to activate the actuator for decelerating a collision-based movement of the loading surface relative to the body against the adjusting direction in response to detection of a collision-based event, wherein;
    the actuator is caused to follow a preset profile to at least partially offset a movement of the loading surface arising from a rebound effect of the motor vehicle post the collision-based event.

16. The system according to claim 15 wherein the sensor is configured to detect a state of collision of the motor vehicle, and the system further comprises a fixing mechanism having a release, wherein the controller is configured to operate the release for permitting movement of the vehicle seat in the adjusting direction in response to a detected state of collision.

17. The system according to claim 15 wherein the sensor is configured to detect an imminent collision of the motor vehicle, and wherein the controller is configured to activate the actuator in order to accelerate the vehicle seat in adjusting direction before the imminent collision when an imminent collision is detected.

18. The system according to claim 15 further comprising a sensor configured to determine a permissible feed travel of the vehicle seat against the adjusting direction, wherein the controller is configured to activate the actuator based on the determined permissible feed travel.

19. The system according to claim 18, wherein the controller is configured to activate the actuator before a collision-based movement of the vehicle seat relative to the body against the adjusting direction.

20. The system according to claim 18, wherein the controller is configured to activate the actuator during a collision-based movement of the vehicle seat relative to the body against the adjusting direction.

* * * * *